United States Patent

Groth, Jr.

[15] 3,701,018
[45] Oct. 24, 1972

[54] ACQUISITION METHOD FOR MULTI-TRANSMISSION POSITION LOCATING OR NAVIGATING SYSTEMS

[72] Inventor: Edward John Groth, Jr., Scottsdale, Ariz.

[73] Assignee: Motorola, Inc., Franklin Park, Ill.

[22] Filed: Feb. 22, 1971

[21] Appl. No.: 117,493

[52] U.S. Cl..................325/58, 178/69.5 R, 343/102
[51] Int. Cl...............................................H04l 7/00
[58] Field of Search..325/51, 58; 178/69.5 R, 69.5 F; 343/6.5 R, 7 R, 7.5, 6.5 LL, 102, 103

[56] References Cited

UNITED STATES PATENTS

| | | | |
|---|---|---|---|
| 3,350,644 | 10/1967 | McNair | 325/58 |
| 3,388,393 | 6/1968 | Graham et al. | 343/7.5 |
| 3,564,544 | 2/1971 | Scott et al. | 343/6.5 |

*Primary Examiner*—Benedict V. Safourek
*Attorney*—Mueller & Aichele

[57] ABSTRACT

A method is disclosed for reducing the time needed to synchronize N code receivers at one station with respect to ones of N code transmitters at different stations wherein all transmitters radiate the same code word, but time delayed relative to each other by fractional word length intervals which may be inversely proportional to the number (N) of transmitters and include an additional small time interval, which may be a lead or a lag, added to or subtracted from all codes but one for identification purposes. In the initial search mode of the synchronization, all N of the receivers are used with the receiver coders being moved together but retaining a fixed relationship with each other. Code words, which are generated locally in each receiver, and which are identical with the transmitted code words, are time-delayed with respect to each other by a fractional word length interval which may be inversely proportional to the square of the number of transmitters, whereby the initial search time for one of the receivers to lock up with or acquire one of the transmitters is reduced on the average to a small fraction equal to $1/2N^2$, for example, of a word length. When synchronization of any one transmitter with any one receiver is accomplished, the known delay between the transmissions (without taking into account the identification delay) is used to synchronize transmissions of the remaining transmitters with locally generated signals of the remaining receivers. Then the known identifying lag or lead delay is used to identify the particular transmitters which have been synchronized with particular receivers.

11 Claims, 3 Drawing Figures

PATENTED OCT 24 1972 3,701,018
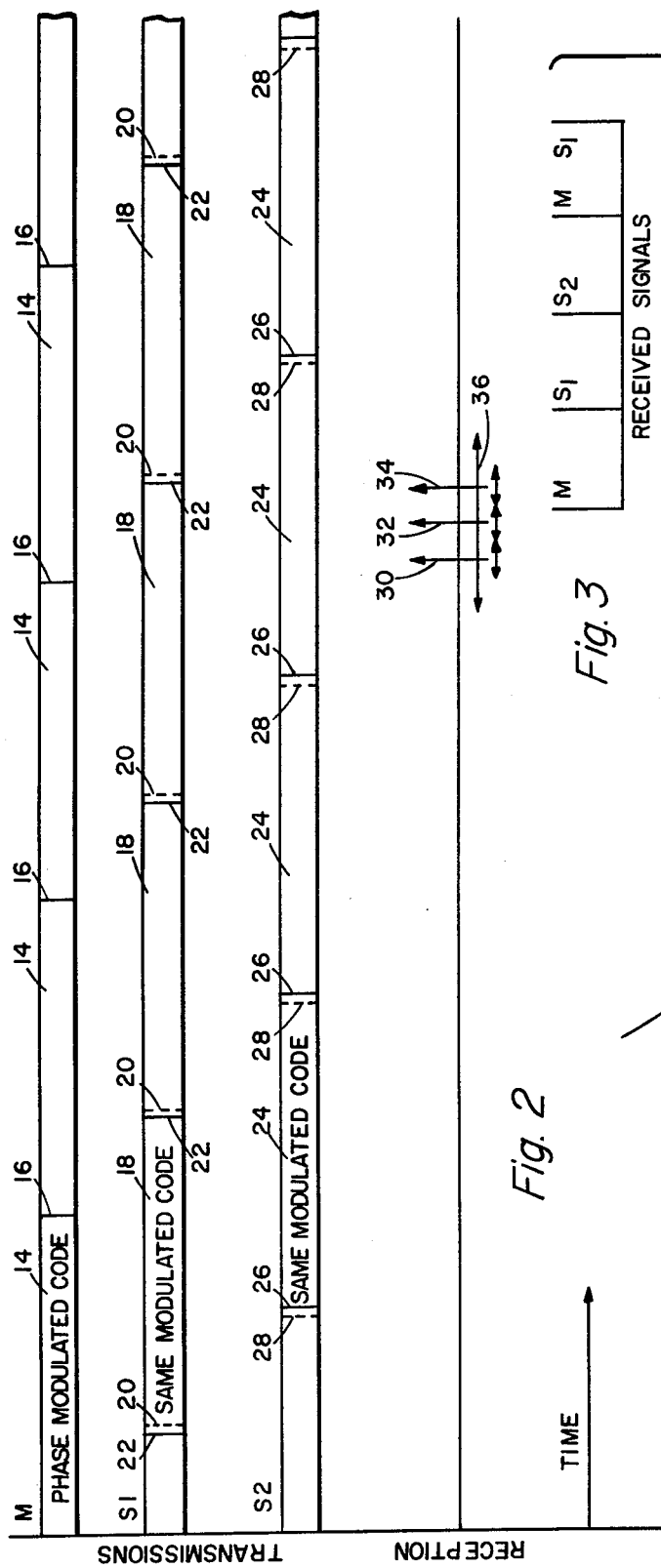
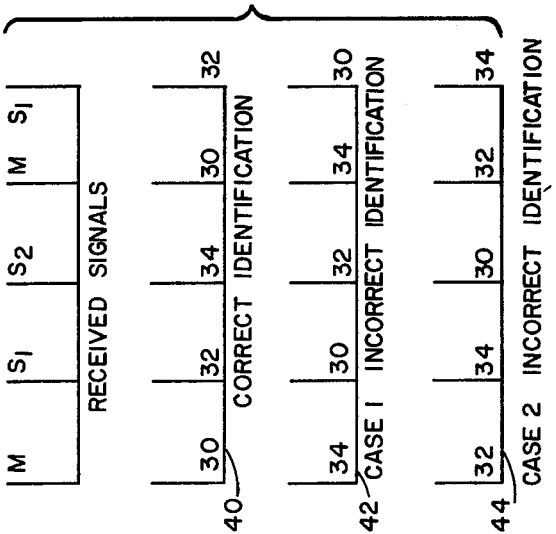
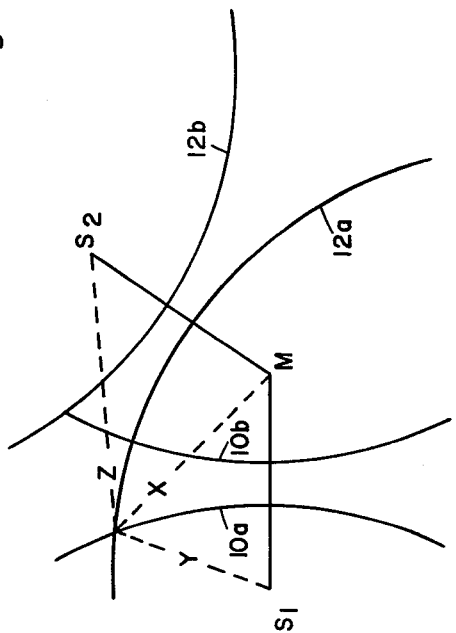
INVENTOR.
Edward J. Groth Jr.
BY
Mueller & Aichele
ATTY'S.

ACQUISITION METHOD FOR MULTI-TRANSMISSION POSITION LOCATING OR NAVIGATING SYSTEMS

BACKGROUND OF THE INVENTION

In multi-transmissions position locating or navigation systems of which a hyperbolic system is one form, a master transmitter and one or more slave transmitters each at a separate location, radiate position indicating signals which are received by respectively designated master and slave receivers, all the receivers being at one location, for example on board a craft whose position is to be determined. When it is known that each of three (or more) receivers is receiving the signal of a respective transmitter, the information received may be used in a well known manner for the craft to locate itself in its environment. The signals from each transmitter are coded for identification purposes and in the process of determining that a particular receiver in the craft is receiving a signal from an identified transmitter, in a known position locater such as Loran C, a separate search is made in each transmitter-receiver channel. For example, a search is made first in the master channel and then in each slave channel. When a specific receiver has its locally generated code completely matched to, that is synchronized with, the code of a transmitter, it is said that the receiver has acquired the signal of that transmitter, or in short, that the receiver has acquired that transmitter. Searching to match receiver to transmitter is a time consuming process, and when searching is carried on in each channel separately, of a multi-channel system, the total search time is greatly increased.

It is therefore an object of this invention to provide an improved acquisition method of the nature indicated which reduces substantially the search time necessary to match up all of the receivers with respective identified ones of all of the transmitters, that is, to cause the receivers to acquire the transmitters.

It is a further object of this invention to provide an improved acquisition method of the nature indicated which reduces substantially the search time necessary to match up one receiver with any one transmitter of any multi-channel transmitter-receiver system.

It is a still further object of this invention to provide an improved acquisition method of the nature indicated wherein all of the receiver channels are utilized to search for any one of the transmitted signals.

It is another object of this invention to provide an improved acquisition method of the nature indicated in which, after one receiver is matched to one transmitter, it is a simple procedure to match up the remaining receivers with the remaining transmitters and to identify each transmitting station.

SUMMARY OF THE INVENTION

In accordance with this invention, the transmissions which are sent out from the master and all of the slave transmitters, which will be at least two in number, consist of the same code word which may be a sequence of ones and zeros, represented, for example, by phase modulation of a carrier. Each receiver, which is set up to receive this uniform code word, will receive signals from any of the transmitters. The several transmitters send out this identical code word but they transmit the code word staggered or delayed in time by a predetermined amount, this amount being advantageously the time length of the code divided by the number of transmitters. On the basis of this one-third code word transmission spacing, the initial search time to achieve matching up of the code word of one receiver with the code word of one unidentified transmitter would be one-third of that needed if each transmitter sent out its own individual code word.

There are as many receivers at one position as there are transmitters at their individual positions or stations and at the beginning of the acquisition or matching up process, the receiver coders are adjusted to generate their identical code words at time intervals that also are staggered by predetermined amounts. Preferably, they are staggered by time intervals equal to the time length of the code word divided by the square of the number of transmitters, that is, one-ninth in the present specific instance. In other words, if all of the receiver coders are moved together by the same amount and in the same direction, the acquisition time by one of the receivers of a transmitter is still further reduced by a factor equal to the number of receivers. The aforementioned search time for matching up the locally generated code word of one receiver with the transmitted code word of one, as yet, unidentified transmitter has been reduced to no more than one-ninth of a code word. Knowing the time length of the code and the number of transmitters whose code words are being received, the other receivers which have not yet had their codes synchronized with a transmitter, can easily have the start of their code words adjusted to be in close vicinity to the start of the code words transmitted by the other transmitters. Thereby the time of synchronizing or matching up the other receivers with the other transmitters is greatly reduced. The transmitters are identified by varying their transmission time (lead or lag) by a few bits of the code in one of various manners. As stated above, once the receivers are synchronized with the transmitters, and the transmitters are identified the rest of the craft locating process is done in a known manner.

BRIEF DESCRIPTION OF THE DRAWINGS

The invention will be better understood upon reading the following description in connection with the accompanying drawing in which:

FIG. 1 illustrates the general operation of hyperbolic position indicators, and

FIGS. 2 and 3 illustrate the acquisition and station identification method of this invention.

Turning first to FIG. 1, a master station is at the point marked M, a first slave station is positioned at the point marked $S_1$ and a second slave station is positioned at the point marked $S_2$. If codes are transmitted from the transmitter at M and at $S_1$ at the same instant, they will arrive at a point in the area surrounding the stations, M and $S_1$, at times which will differ proportionately to the difference in distance between the point in space and the two stations M and $S_1$. The locus of all points exhibiting the same time difference is the hyperbola having branches 10a and 10b. Since the sign of the time differences are different, the branch 10a can be distinguished from branch 10b which is ignored. Therefore, the point in space, which could be a craft, is somewhere along the hyperbola branch 10a. If the difference in distance of the point in space is now measured to the master M and to the slave $S_2$, it is noted that the point is also on the second hyperbola having branches 12a and 12b and the branch 12a is distinguished from the branch 12b in a similar manner and branch 12b is therefore ignored. Therefore the unknown point is limited to the crossing of the two hyperbolas 10a and 12a. At most there would be two crossings, but other criteria such as the range or the topography or knowledge of a recent position of the craft will be helpful in limiting the unknown points to a particular crossing of the hyperbola branches 10a and 12a. Radio receiver channels on the craft which identify a transmitter by the code that is transmitted thereby and which measure the difference in time of reception of the signals are used to establish the hyperbolas on the intersection of which a craft is found whereby the location of the craft is determined.

In accordance with a known hyperbolic or other multitransmission locating system, the master station M may transmit a code comprising ones and zeros modulated on a transmitted carrier wave to provide a word which may be many thousands of bits long. The word, therefore, comprises a series of many ones and zeros in proximity and the code word is repeated cyclicly each time it is completed. The difference between a one and a zero may be put on the transmitted carrier wave by phase modulation thereof. The code word or code is indicated in FIG. 2 by the reference character 14. Immediately that the complete code has been sent out, it is repeated and this continues indefinitely, the lines 16 in FIG. 2 indicating when the code 14 has been completed and a new identical code has been started.

The transmitter at $S_1$ sends out exactly the same code word which is endlessly repeated; however, the code word 18 sent out by the transmitter $S_1$ is sent out one-third of a code word after the code word sent out by the master station M is sent out, plus or minus a few bits for station identification. The dotted lines 20 indicate when the code word 18 would end and start if it were sent out nearly exactly one-third of the length of the word 14 after that word started. The solid lines 22 indicate when the code word 18 actually starts and stops for the transmitter $S_1$, the number of bits between the lines 20 and 22, which may be called $\Delta$ for convenience, being used for station identification as will be explained. It will be noted that the word 18 leads by a few bits which are equal to $\Delta$, the time position which lags the word 14 by one-third the length of the word.

The transmitter $S_2$ sends out words 24 which start and stop at the solid lines 26. The words 24 are exactly like the words 14 but the words 24 lag the word 14 by two-thirds of the length of the word 14 plus a few bits, again equal to $\Delta$, to identify the station $S_1$. The two $\Delta$'s need not be of the same length or of the same or different signs. They must be known and fixed. The $\Delta$'s should be equal to or greater than the time of travel of a wave the length of the base line for a reason which will be explained. In the case of the station $S_2$, $\Delta$ is a lag time. If the words 24 lagged the words 14 by two-thirds the length of the word 14, the words 24 would start and end on the dotted lines 28.

Proper synchronization of the words 14, 18 and 24 can be provided by known circuitry in the transmitters M, $S_1$ and $S_2$. As described in connection with FIG. 1, a craft having equipment for receiving the several words 14, 18 and 24 and for identifying their sources M, $S_1$ and $S_2$ can be located by the general method of FIG. 1. As noted, however, the receiver codes must be shifted until they match up, or synchronize with, the code words 14, 18 and 24, that is they must acquire the transmitted signals. Synchronization of the two codes will be indicated by the fact that a significant and steady output signal is obtained by the particular receiver.

According to the method according to the invention, in one form, a craft to be located has thereon three receivers indicated by the arrows 30, 32 and 34, each of which is identical to the other in that each can acquire the words 14, 18 or 24. That is, a coded receiver 30, 32 or 34, receives the transmitted code from the transmitters M, $S_1$ and $S_2$. If the received code word coincides in time position with the code built into the receiver, the receiver provides a significant output, that is, the receiver acquires the transmitter, otherwise the output is of low amplitude or is a noise. Since each of the transmitted words 14, 18 and 24 is identical, the local code words of receivers 30, or 32 or 34, if shifted in time during the third of a length of a word 14, 18 and 24, will synchronize, or match up with, one of the words 14, 18 and 24 but initially, it will not be known which of the transmitted words has been synchronized with which receiver word.

This can be seen, since in the length of a word 14 or 18 or 24, there are three start lines 16 or 22 or 26. Now, if the three receivers 30, 32 and 34 are so tied together electrically or mechanically, as indicated by the double headed arrow 36 (the portion of FIG. 2 labelled reception), that their code words are all moved in time in either direction together, and if the code timings set thereinto are the same, or nearly the same, and spaced by one-third word, a word beginning 16 or 22 or 26 will be perceived by one of the receivers in one-third of the time that it takes to find the beginning of a word using only one of the receivers at a time to search the whole word length.

However, the locally generated code words of receivers 30, 32 and 34 are spaced in time by intervals of one-ninth of a code word as shown by the spacings of the vertical arrows 30, 32 and 34. That is, the one-third code word interval of the transmitters is further subdivided by one-third code intervals at the receivers. The time for one receiver to match up with one transmitter is thus about one-ninth of a code word. As may be seen in FIG. 2, if the code words of the three receivers 30, 32 and 34 (i.e. the arrows 30, 32 and 34) are moved together to the right, the receiver 34 will almost immediately get to a beginning line 22 and acquire the word 18. Or if the code words of the three receivers 30, 32 and 34 are all moved in time together to the left, the receiver 30 will very soon acquire the word 14 by arriving at the beginning line 16. The greatest time for one match up, or the worst case, is one-ninth of a code word as may be visualized by the arrow 30 being one-ninth of a code word away from beginning line 16 and being moved toward it. On the average about one-half the one-ninth interval would be needed.

Contrast this method of acquisition with a case where each transmitter M, $S_1$ and $S_2$ sends out its own code and each receiver can acquire only one station M, $S_1$ or $S_2$. It will be seen that the method of acquisition here described the first transmission is acquired in a time which is much less than that required when each transmitter sends out its own code. Furthermore, in accordance with this method, as soon as one station is acquired, the two positions of the beginnings of the other words is known within a few bits because of the one-third code word spacings. Hence the other receiver codes can be time adjusted to be very close to the beginning of the other two words. Contrast this with the system where each transmitter transmits a different word. In that system, the other receivers must still acquire the proper transmission by the trial and error method whereby the total time of acquisition is about nine times the time of acquisition of one station.

After the receivers 30, 32 and 34 have each acquired one word of the words 14, 18 and 24, since the words are identical, it is not yet known which receiver has acquired the word of which station. Station identification is illustrated in FIG. 3. Simple arithmetic is used in this identification as follows: The difference in delay of the reception between the receivers 30 and 32 and also by the receivers 30 and 34 is measured. While there will be an unknown term, that due to the range of the craft to the stations, the maximum difference in delay as indicated by pair of stations 30 and 32 or 30 and 34 cannot be greater than the time of propagation of the radiated waves for the distance of the base line $S_1$ to M or $S_2$ to M and furthermore this indicated distance cannot be negative. The identification timing, that is, the interval of time $\Delta$ indicated by the distance between the lines 22 and 20 or 26 and 28 is made larger than the time of propagation for the distance of the greater of the two base lines.

Let is be assumed that the receivers 30, 32 and 34 have acquired the code words of the master transmitter M and the slave transmitters $S_1$ and $S_2$, respectively. This is the correct case and this will happen on the average of once in three times. This case is illustrated on line 40 of FIG. 3. Now, the delay may be measured in the usual manner by comparing the outputs of the receivers 30 and 32. The delay of the output of the receiver 30 includes several components. They are the delay by the transmitter which, where the transmitter is M, is zero and the time it takes for the wave to get from the transmitter M to the craft or the propagation time X and the delay in the receiver, which for the receiver 30 is zero. Therefore the delay shown by the receiver 30 when it has acquired the transmitter M is X. As for the receiver 32, it has a lead of a third of a word set thereinto. So the delay as indicated by the receiver 32 is the delay of one-third of a word or one-third of W, minus $\Delta$ which is the identification lead in the transmitter $S_1$, plus the propagation delay Y due to the propagation of the wave from the transmitter $S_1$ to the craft, less the lead of one-third of a word or one-third W put into the receiver 32. Therefore, the delay by the receiver 32 is minus $\Delta$ plus Y. Subtracting $-\Delta +Y$ from X gives $\Delta -Y +X$. This delay is the difference in the indications by the receivers 30 and 32. It is positive and it is between 0 and $2\Delta$.

Similarly when comparing the reception by the receivers 30 and 34, the delay in the output of the receiver 30 is X as before and the delay indicated by the receiver 34 is the delay in the transmission by the transmitter $S_2$ which is ⅔ W + $\Delta$ plus the propagation delay Z from the transmitter $S_2$ to the craft, minus the lead of two-thirds W fed into the receiver $S_2$. This total delay for the receiver 34 is $\Delta + Z$. Subtracting, $\Delta + Z - X$ equals an amount which is always positive and is in the range of 0 to $2\Delta$. When the differences, as indicated by the comparisons of the receivers 30 and 32, as well as 30 and 34 are both positive and less than $2\Delta$, then the acquisitions are correct.

There are two possible incorrect acquisitions, each having a probability of one-third. One thereof is that when the receiver 34, instead of having acquired the slave $S_2$ has acquired the master M, the receiver 30, instead of having acquired the master M has acquired the slave $S_1$ and the receiver 32 has acquired the slave $S_2$. This is shown in line 42 of FIG. 3 and is called Case 1 for identification purposes. Then the delay in the output of the receiver 34 consists of the delay of zero as caused by the transmitter M plus the X propagation delay from the transmitter M to the craft minus the two-third W lead set into the receiver 34. This equals X minus two-thirds W. The delay in the output of the receiver 30 consists of the delay of one-third $W - \Delta$ as caused by the transmitter $S_1$ plus the Y propagation delay plus the 0 delay in the receiver 30. This equals one-third $W - \Delta +Y$ and the difference in the delays between the receivers 30 and 34 is $-W +\Delta +X -Y$ which is negative and is much greater than the maximum range.

Similarly when comparing the delays indicated by the receivers 30 and 32, the delay in the receiver 30 is as above and is equal to one-third $W -\Delta +Y$. The delay in the receiver 32 consists of the delay of two-thirds $W + \Delta$ caused by the transmitter $S_2$, Z propagation delay plus the lead of minus one-third W in the receiver 32. Therefore, the delay as shown by the output of the receiver 32 is one-third $W + \Delta +Z$. Comparing the outputs of the receivers 30 and 32 gives one-third $W -\Delta +Y -⅓ W -\Delta -Z$ which is equal to $-2\Delta +Y -Z$. This is a negative value and it is also between $-2\Delta$ and 0. It is therefore known that the receivers 30, 32 and 34 have acquired $S_1$, $S_2$ and M, respectively. By changing the delays set thereinto, the receivers 30, 32 and 34 easily can be made to acquire the transmitters M, $S_1$ and $S_2$ which is the correct case.

In the other incorrect acquisition, Case 2, illustrated at line 44 of FIG. 3, the receivers 32, 34 and 30 have acquired transmitters M, $S_1$ and $S_2$, respectively, instead of $S_1$, $S_2$ and M, respectively as would have been the correct case. In Case 2, the delay in the output of the receiver 30 consists of a delay of two-thirds $W + \Delta$ lag in transmission by the transmitter $S_2$ plus Z propagation time plus a 0 lag or lead in the receiver 30. This equals two-thirds $W + \Delta +Z$ time delay. The delay in the output of the receiver 34 which has acquired $S_1$ consists of a delay of one-third $W - \Delta$ by the transmitter $S_1$ plus Y propagation delay minus two-thirds W lead in the receiver 34. This is equal to minus ⅓ $W -\Delta +Y$. The difference in the delays between the receivers 30 and 34 is $-W -2\Delta +Y -Z$ which is negative and is much too great. Similarly, when comparing the delays in the receivers 30 and 32, the delay in the receiver 30 is the same as before and is equal to two-thirds $W +\Delta +Z$. The delay at the output of the receiver 32 consists of a delay of 0 in the transmitter M plus X propagation delay minus ⅓ W lead in the receiver 32. This is equal to X minus ⅓ W. Subtracting the delay at the output of the receiver 32 from the delay at the output of the receiver 30 gives two-thirds $W + \Delta + Z + ⅓ W - X$. This is equal to $W + \Delta + Z - X$ and is much too great. Knowing that both output delay differences are about the same, much too great and different in sign, it will be known that the receiver 30 has acquired the transmitter $S_2$, the receiver 32 has acquired the transmitter M and the receiver 34 has acquired the transmitter $S_1$. Adjustments easily can be made in the delays set into the three receivers 30, 32 and 34 so that they will acquire the transmitters M, $S_1$ and $S_2$ respectively. Having acquired the proper transmitters and knowing the identification delay and the advance from each transmitter, allowances can be made for the identification delay or advance and a ranging device gives the position of the craft.

Transmitter identifying means other than a small lead or lag in code word time interval may be used.

While the acquisition system has been described in connection with a code which is continuously transmitted by the several transmitters, it is possible to have transmitting stations that transmit alternately, that is, no two transmitters are transmitting simultaneously with any other. However, the several transmitters will still send out exactly the same codes, displaced in time in a nearly equal manner, there being a small delay or lead from the uniform positioning in time of the transmissions of two of the transmitters with respect to a third for identification purposes, in the manner noted hereinabove.

What is claimed is:

1. The method of synchronizing the internally generated codes of a plurality of receivers which are at one location with respect to the transmitted codes of respective ones of a plurality of transmitters at different locations comprising:
   generating an identical cyclical code at each of said transmitters,
   transmitting the code of each transmitter delayed in time from transmitter to transmitter by a predetermined amount,
   generating said identical cyclical codes at each of said receivers but delayed in time by an amount which is substantially less than said predetermined amount,
   applying the transmitted codes of all of said transmitters to all of said receivers, and
   changing the time of relationship of all of the receiver codes together relative to all the codes applied to the receivers until one of the receiver codes synchronizes with one of the transmitted codes.

2. The method of claim 1 in which said predetermined time interval is equal to the length of the code word divided by the number of transmitters.

3. The method of claim 2 wherein the said time interval includes a plus or minus small amount.

4. The method of claim 3 in which the said small amount is a lag or lead transmitter identification period.

5. The method of claim 1 wherein after one receiver code is synchronized with one transmitted code, the time relationship of the other receiver generated codes are shifted by an amount related to the delays between the said transmissions to synchronize the other receivers to respective transmitters.

6. The method of claim 2 wherein after one receiver code is synchronized with one transmitted code, the time relationship of other receiver generated codes are shifted by amounts related to the delay between said transmissions to synchronize the other receivers to respective transmitters.

7. The method of synchronizing the internally generated code words of a plurality of receivers which are at one location with respect to the transmitted code words of respective ones of a plurality of transmitters at different locations comprising:
   generating identical cyclical code words at each of said transmitters,
   transmitting the code words of each transmitter delayed in time from transmitter to transmitter by a predetermined amount,
   generating said identical cyclical code words at each of said receivers but delayed in time by an amount which is substantially less than said predetermined amount,
   applying the transmitted codes of all of said transmitters to all of said receivers, and
   changing the time relationship of all the receiver code words together relative to all of the code words applied to the receivers until one of the receiver code words synchronizes with one of the transmitted code words.

8. The method of claim 7 in which said predetermined amounts are chosen to include a transmitter identification period.

9. The method of claim 7 in which all of said receivers are varied differing amounts determined by said predetermined amount whereby said receivers match up with respective transmitters.

10. In the system of synchronizing the internally generated codes of a plurality of receivers which are at one location with respect to the transmitted codes of respective ones of a plurality of transmitters which are at different locations wherein the transmitters transmit the same code word delayed in one transmitter with respect to another transmitter by a time interval equal to the time length of said code divided by the number of transmitters, the method comprising:
    generating said identical code words in each of said receivers but delayed by an amount in one receiver with respect to another which is equal to the length of said code word divided by the square of the number of transmitters,
    applying the transmitted waves of all of said transmitters to all of said receivers and,
    changing the time relationship of all of the receiver code words together relative to all of the code words applied to the receivers until one of the receiver code words synchronizes with one of the transmitted code words.

11. The system of claim 10 wherein the receivers which are not synchronized with transmitters, the code words are adjusted by amounts related to the transmitter and receiver delays until each remaining receiver code word is synchronized with a respective one of the transmitter code words.

* * * * *